UNITED STATES PATENT OFFICE 2,496,290

PROCESS FOR THE SEPARATION AND RECOVERY OF INORGANIC SALTS

Clifford A. Hampel, Harvey, Ill., assignor to Cardox Corporation, Chicago, Ill., a corporation of Illinois No Drawing. Application June 23, 1947, Serial No. 756,544

6 Claims. (Cl. 23—85)

This invention relates to a process for the separation of sodium chlorite, potassium chlorate and calcium sulfate from mixtures containing all three of these salts.

Mixtures of salts which it is the purpose and object of the invention to separate are produced in various ways. One exemplary reaction resulting in the the production of such mixtures is the following:

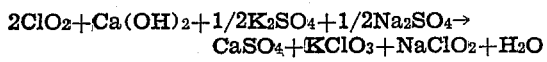

$$2ClO_2 + Ca(OH)_2 + 1/2K_2SO_4 + 1/2Na_2SO_4 \rightarrow CaSO_4 + KClO_3 + NaClO_2 + H_2O$$

Due to the relative insolubility of the calcium sulfate it can be, to a substantial extent, removed as a solid by filtration. However, a small portion of the calcium sulfate remains in solution along with the sodium chlorite and potassium chlorate and it is desirable for many purposes that the latter salts be separated from the calcium sulfate and from each other. Calcium sulfate is an undesirable contaminant in either sodium chlorite or potassium chlorate for many uses of these compounds and it is accordingly desired that these compounds be recovered without admixture with calcium sulfate.

In accordance with the present invention the water content of the solution containing the several salts should be so controlled, either in the reaction producing the mixture of salts or by subsequent addition of water to the mixture so as to keep all the potassium chlorate formed in solution. The solution is filtered under these conditions and a large amount of the initially contained calcium sulfate is removed thereby. While this is a necessary expedient, the present invention is concerned primarily with the subsequent treatment of the filtrate containing, as indicated, sodium chlorite, potassium chlorate and a small quantity of calcium sulfate. When the mixture is produced pursuant to the exemplary reaction above given, the filtrate contains sodium chlorite and potassium chlorate in equivalent amounts as well as a small but appreciable quantity of calcium sulfate. It has been found, for example, that at 60° C. a solution of the two principal salts saturated with respect to potassium chlorate will contain, on a dry basis, 41.6 percent sodium chlorite, 56.5 percent potassium chlorate, and 1.9 percent of calcium sulfate.

It is recognized that the calcium sulfate is present in quite small amounts. However, since compounds such as sodium chlorite are frequently used in textile processes, and the presence of calcium, even in small amount, is objectionable because of the hardness imparted to the water thereby, it is important that the principal salts, sodium chlorite and potassium chlorate, be separately recovered.

To accomplish this end the filtrate, following removal of the major portion of the calcium sulfate, is concentrated by evaporation of its water content until it is saturated with respect to sodium chlorite at a temperature convenient for the filtration of the potassium chlorate precipitated by the removal of water. An appropriate temperature for this step is approximately room temperature. The filtration for the removal of the potassium chlorate is advantageously conducted in stepwise manner with progressive removal of the potassium chlorate to thereby prevent the formation of such a thick slurry that filtration is rendered difficult.

The water removal for the purpose of separating the potassium chlorate should be restricted to an amount such that the precipitation of the potassium chlorate leaves in solution sodium chlorite and potassium chlorate in a mole ratio which approaches, but is less than, about 92 moles sodium chlorite per 8 moles potassium chlorate at the selected filtration temperature. By controlling the removal of water and restricting such removal when the ratio of sodium chlorite to potassium chlorate in solution is at this 92 to 8 ratio, none of the sodium chlorite will be precipitated along with the potassium chlorate. For best results, the filtration temperature for separating out the potassium chlorate at this stage should be 34° C. or somewhat less. In any event, sufficient water should be left in the solution to insure that all of the sodium chlorite is held in solution at the temperature selected for the filtration step employed to remove the potassium chlorate.

None of the calcium sulfate carried in the solution is precipitated by the initial concentration and, therefore, the potassium chlorate separated out at this stage is recovered free from contaminating calcium sulfate. The filtrate from which the potassium chlorate has been separated is next further concentrated by evaporation until it is again saturated with potassium chlorate at some selected temperature above 34° C. By this concentration a mixture of sodium chlorite and calcium sulfate is precipitated. Furthermore, the higher the temperature employed in this concentration step the greater the yield of the mixed sodium chlorite and calcium sulfate. However, the final temperature should not exceed the temperatures at which sodium chlorite undergoes any substantial decomposition. Temperatures of the order of 60° to 75° C. are recommended, though slightly higher temperatures may be used.

When the mixture of sodium chlorite and calcium sulfate is precipitated at approximately 60° C. the solid mixture will contain a ratio of approximately 4.5 parts by weight of calcium sulfate to 95.5 parts by weight of sodium chlorite. This solid mixture may be treated to effect substantial recovery of uncontaminated sodium chlorite as will hereinafter be more specifically described. The motor liquor or filtrate left after the separation of the solid mixture of sodium chlorite and calcium sulfate is advantageously recycled to the start of the separation process to be mixed with the next fresh batch undergoing treatment.

The solid mixture of sodium chlorite and calcium sulfate is preferably treated by the addition of sufficient water to bring all of the sodium chlorite into solution at some selected temperature above 35° C., the higher the selected temperature the better so long as it does not occasion deleterious decomposition of the sodium chlorite. A temperature of about 60° C. has been found satisfactory. The undissolved calcium sulfate is filtered off at this elevated temperature without loss of sodium chlorite. By then cooling the remaining solution or filtrate to a temperature not less than about 35° C., anhydrous sodium chlorite, free from contaminating calcium sulfate, is precipitated as a pure solid. After filtration the mother liquor may be be recycled to the start of the process.

In accordance with the foregoing procedure it will be observed that all three salts initially present in the mixture are separated without contamination and without losses other than those occasioned in the handling of the material.

In some instances, it may be expedient to subject the hot filtrate, following the precipitation of the mixed sodium chlorite and calcium sulfate, to cooling from the temperature at which the mixed salts were precipitated to a temperature not less than about 34° C. to thereby precipitate a second crop of potassium chlorate. This expedient is primarily desirable if the mother liquor is not being recycled.

Still another possible procedure entails the evaporation of the mother liquor following recovery therefrom of the anhydrous sodium chlorite contained in the precipitated mixed sodium chlorite and calcium sulfate until this mother liquor is again saturated with respect to sodium chlorite. This can be accomplished at a temperature of the order of 60° C. Some additional calcium sulfate will thereby be precipitated and can be filtered off and the final filtrate cooled again to a temperature of about 35° C. to precipitate a further crop of anhydrous sodium chlorite. By repetition of these steps any particular batch of sodium chlorite and calcium sulfate can eventually be entirely separated into its constituent salts.

The following examples are illustrative of the process:

*Example 1*

A slurry of 74 parts of calcium hydroxide, 87.1 parts of potassium sulfate and 71 parts of sodium sulfate in 576 parts of water was reacted with 135 parts of chlorine dioxide, the chlorine dioxide being introduced as a 5 percent gas in air as a diluent. The solid calcium sulfate formed by the reaction was filtered off at about 25° C., 132.7 parts of the solid calcium sulfate being recovered while 3.3 parts of this salt remained dissolved in the filtrate. The filtrate was then concentrated by evaporation until a total of 114 parts of water was left. During this evaporation the precipitated potassium chlorate was separated stepwise, a total of 111.2 parts of solid potassium chlorate being recovered by a final filtration at 25° C.

The solution was next further concentrated by evaporation until a total of 33.7 parts of water was left. A filtration at 60° C. separated 51.5 parts of sodium chlorite and 2.37 parts of calcium sulfate as a solid mixture. Mother liquor from this filtration was returned to the process along with the next fresh batch for recycling. The solid mixture of sodium chlorite and calcium sulfate was treated with 31.4 parts of water at 75° C. to dissolve all of the sodium chlorite, leaving 1.6 parts of calcium sulfate undissolved. The latter was removed by filtration and the filtrate cooled to 35° C. to precipitate 26.3 parts of anhydrous sodium chlorite. After separating this sodium chlorite, the mother liquor was added back along with more water to treat the next mixture of sodium chlorite and calcium sulfate.

*Example 2*

Another batch such as that described in Example 1 was carried through all of the operations described therein, however, the final liquor composed of 25.3 parts of sodium chlorite, 0.8 parts of calcium sulfate and 31.4 parts of water was further treated by evaporation until the water content had been reduced to 15.2 parts. A filtration at 75° C. removed 0.15 part of solid calcium sulfate, and cooling to 35° C. precipitated a second crop of 13.5 parts of sodium chlorite. The 27.8 parts of mother liquor were returned for recycling along with the next batch of solid mixture of sodium chlorite and calcium sulfate.

*Example 3*

A solution containing 122.6 parts of potassium chlorate, 90.5 parts of sodium chlorite and 3.3 parts of calcium sulfate in 576 parts of water was concentrated by evaporation until only 114 parts of water remained. During this operation a total of 111.2 parts of potassium chlorate precipitated and was removed by filtration at 25° C. The filtrate was next concentrated by evaporation to lower the water content to 33.7 parts. Filtration at 60° C. separated the 51.5 parts of sodium chlorite and 2.37 parts of calcium sulfate precipitated by the removal of water. The filtrate was cooled to 34° C. and 4 parts additional potassium chlorate was precipitated. Subsequent operations for the treatment of the mixture of solid sodium chlorite and calcium sulfate followed those described in Example 1.

Mixtures of dry salts can be processed by adding water to produce a composition equivalent to the initial one described in Example 3 above. If the calcium sulfate content is less than about 0.037 part of calcium sulfate per part of potassium chlorate on a weight basis, the water content may be limited to an amount sufficient to keep all of the sodium chlorite in solution at some temperature less than about 34° C. The undissolved potassium chlorate is filtered off, since this solution composition corresponds to that obtained at the end of the first evaporation previously described. Subsequent processing follows the same routes as have been outlined in the examples. If the calcium sulfate content is higher than the above ratio, enough water should be added to the dry salt mixture to dissolve all of the potassium chlorate. Any undissolved calcium sulfate is removed by filtration, and the liquid remaining is processed in accordance with the previously described methods.

If desired, the solid mixture of calcium sulfate and sodium chlorite could be dried and marketed as such. Thus, the mixture separated at 60° C. would be about 95 percent sodium chlorite and 5 percent calcium sulfate. A useful product can be made from this mixture by adding to the dry sulfate-chlorite mixture sodium carbonate in an amount equivalent to the calcium sulfate. When dissolved for use, this product would then form a precipitate of calcium carbonate to effectively remove calcium ion from the system. The sulfate portion of the calcium sulfate ends up as sodium sulfate in solution, the ratio of sodium sulfate to sodium chlorite being slightly more than the original calcium sulfate to sodium chlorite ratio.

Reference is made to the following copending applications which are related to the subject matter disclosed herein: applications S. N. 647,403 and 659,042, now Patents No. 2,489,572 and No. 2,489,574, respectively, which relate to processes for the preparation of metal perchlorates and chlorine dioxide; application S. N. 647,404, now Patent No. 2,489,573, which relates to a process for the preparation of the chlorate and chlorite of different metals; and application S. N. 647,396, now Patent No. 2,489,571, which relates to a process for the preparation of the perchlorate and chlorite of different metals.

Having thus described my invention, what I claim is:

1. A process for separating sodium chlorite, potassium chlorate and calcium sulfate from mixtures containing these salts comprising: regulating the water content of the mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 8 moles of potassium chlorate, again concentrating the solution by evaporation until it is again saturated with potassium chlorate at a temperature of at least 34° C., whereby there is precipitated a mixture of sodium chlorite and calcium sulfate from the solution, and thereafter separating the precipitated mixture from the solution at an elevated temperature below the decomposition temperature of sodium chlorite.

2. A process for separating sodium chlorite, potassium chlorate and calcium sulfate from mixtures containing these salts comprising: regulating the water content of the mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 8 moles of potassium chlorate, again concentrating the solution by evaporation until it is again saturated with potassium chlorate at a temperature of at least 34° C., whereby there is precipitated a mixture of sodium chlorite and calcium sulfate from the solution, thereafter separating the precipitated mixture from the solution at an elevated temperature below the decomposition temperature of sodium chlorite, subjecting the mixture of sodium chlorite and calcium sulfate to treatment with added water at a temperature of approximately 75° C. to dissolve all of the sodium chlorite in the mixture, separating out undissolved calcium sulfate, thereafter cooling the filtrate to approximately 35° C., and precipitating anhydrous sodium chlorite.

3. A process for separating sodium chlorite, potassium chlorate and calcium sulfate from mixtures containing these salts comprising: regulating the water content of the mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 8 moles of potassium chlorate, again concentrating the solution by evaporation until it is again saturated with potassium chlorate at a temperature of at least 34° C., whereby there is precipitated a mixture of sodium chlorite and calcium sulfate from the solution, thereafter separating the precipitated mixture from the solution at an elevated temperature below the decomposition temperature of sodium chlorite, and recycling the mother liquor.

4. A process for separating sodium chlorite, potassium chlorate and calcium sulfate from mixtures containing these salts comprising: regulating the water content of the mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 8 moles of potassium chlorate, again concentrating the solution by evaporation until it is again saturated with potassium chlorate at a temperature of at least 34° C., whereby there is precipitated a mixture of sodium chlorite and calcium sulfate from the solution, thereafter separating the precipitated mixture from the solution at an elevated temperature below the decomposition temperature of sodium chlorite, and finally cooling the remaining filtrate to a temperature of approximately 34° C. to precipitate additional potassium chlorate.

5. A process for the preparation and separate recovery of sodium chlorite, potassium chlorate and calcium sulfate from an aqueous reaction mixture resulting from the reaction of chlorine dioxide with calcium hydroxide, potassium sulfate and sodium sulfate comprising controlling the concentration of the respective constituents of said aqueous reaction mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 8 moles of potassium chlorate, again concentrating the solution by evaporation until it is again saturated with potassium chlorate at a temperature of at least 34° C., whereby there is precipitated a mixture of sodium chlorite and calcium sulfate from the solution, and thereafter separating the precipitated mixture from the solution at an elevated temperature below the decomposition temperature of sodium chlorite.

6. A process for the preparation and separate recovery of sodium chlorite, potassium chlorate and calcium sulfate from an aqueous reaction mixture resulting from the reaction of chlorine dioxide with calcium hydroxide, potassium sulfate and sodium sulfate comprising controlling the concentration of the respective constituents of said aqueous reaction mixture to insure retaining the sodium chlorite and potassium chlorate in solution at a temperature at least as low as 25° C., filtering out most of the calcium sulfate at about 25° C., concentrating the filtrate by evaporation until it is saturated as to sodium chlorite in solution at room temperature, then filtering out potassium chlorate at about 34° C. leaving a solution of sodium chlorite and potassium chlorate in a mole ratio approximating but less than 92 moles sodium chlorite to 2 moles of potassium chlorate, again concetrating the solution by evaporation until it is again saturated with potassium chlorate at a temperature of at least 34° C., whereby there is precipitated a mixture of sodium chlorite and calcium sulfate from the solution, thereafter separating the precipitated mixture from the solution at an elevated temperature below the decomposition temperature of sodium chlorite, and recycling the solution remaining after separation of the precipitated mixture to a previous stage in the process.

CLIFFORD A. HAMPEL.

REFERENCES CITED

The following references are of record in the file of this patent:

UNITED STATES PATENTS

| Number | Name | Date |
|---|---|---|
| 2,169,066 | Cunningham | Aug. 8, 1939 |